United States Patent [19]

Hamada

[11] Patent Number: 4,556,880
[45] Date of Patent: Dec. 3, 1985

[54] LIQUID CRYSTAL DISPLAY APPARATUS

[75] Inventor: Tatsuzo Hamada, Hatano, Japan

[73] Assignee: Hitachi, Ltd., Tokyo, Japan

[21] Appl. No.: 438,257

[22] Filed: Nov. 1, 1982

[30] Foreign Application Priority Data

Nov. 24, 1981 [JP] Japan .................................. 56-188133

[51] Int. Cl.[4] .............................................. G09G 3/36
[52] U.S. Cl. ..................................... 340/814; 340/784;
340/805
[58] Field of Search ................. 340/713, 784, 805, 814

[56] References Cited

U.S. PATENT DOCUMENTS 3,653,745  4/1972  Mao ...................................... 340/784
3,868,674  2/1975  Lorteije et al. ...................... 340/784
3,895,372  7/1975  Kaji et al. ............................ 340/784

Primary Examiner—Marshall M. Curtis
Attorney, Agent, or Firm—Antonelli, Terry & Wands

[57] ABSTRACT

The invention is concerned with a liquid crystal display apparatus which displays data by driving a liquid crystal panel in synchronism with horizontal synchronizing signals and vertical synchronizing signals. The driver for driving the liquid crystal panel is provided with timing signals maintaining a predetermined period, and with a voltage in synchronism therewith, irrespective of the horizontal and vertical synchronizing signals. Therefore, even when the horizontal and vertical synchronizing signals have not been applied, the liquid crystal panel is provided with an a-c voltage of which the polarity is alternatingly reversed by the timing signals. Therefore, electrolysis does not take place in the liquid crystal panel, and the quality of display is not degraded.

7 Claims, 6 Drawing Figures

LIQUID CRYSTAL DISPLAY APPARATUS

BACKGROUND OF THE INVENTION

1. Field of the Invention

The present invention relates to a liquid crystal display apparatus, and more specifically to an apparatus for driving a liquid crystal panel of a relatively large size, which displays characters and pictures.

2. Description of the Prior Art

In recent years, liquid crystals have been extensively used in display devices such as wristwatches, digital clocks, desk-top calculators, and the like. In particular, liquid crystals of the light-receiving type have been placed in extensive applications owing to such features that they can be seen in bright places, they consume small amounts of electric power, and they can be driven on low voltages. Depending upon the operation modes, the liquid crystals can be divided into those of the dynamic scattering effect type (DSM), and those of the field effect type (FEM).

A liquid crystal panel of the dynamic scattering effect type is constructed by, for example, forming an electrode of a transparent electrically conductive film obtained by the evaporation of tin oxide ($SnO_2$) or the like on a glass plate having a thickness of 0.5 mm to several millimeters, sticking two glass plates together via a spacer, and injecting the liquid crystals into space formed therebetween. The thus constructed liquid crystal panel is usually driven by a matrix driving method. Signal electrodes are arrayed on one side, and scanning electrodes are arrayed on the other side in the directions at right angles with each other. By applying a voltage to the selected signal electrodes and to the selected scanning electrodes, the voltage at the intersecting points exceeds a threshold value, whereby the parallel indicent light undergoes scattering and appears in a whitish turbid color. In this case, the liquid crystal panel is deteriorated within short periods of time if a d-c voltage is applied thereto. Therefore, an a-c voltage is usually applied to the liquid crystal panel.

In the case when the liquid crystal display apparatus which displays characters or pictures, and a control device for controlling the liquid crystal display apparatus, are accommodated in a single housing such as of a pocket calculator, drive signals are applied to the liquid crystal display apparatus simultaneously with the closure of the power source, and a direct current does not flow into the liquid crystals. However, when the liquid crystal display apparatus and the control device are separately provided such as in a monitor television, in which the liquid crystal display apparatus has been designed to be driven by input signals produced by the control device, a direct current flows into the liquid crystal panel when no input signals is applied thereto, presenting such a defect that the display quality is degraded.

SUMMARY OF THE INVENTION

The object of the present invention is to provide a liquid crystal display apparatus which prevents the display quality of the liquid crystal panel from being degraded.

Another object of the present invention is to provide a liquid crystal display apparatus which is capable of applying an a-c voltage to the liquid crystal panel even when no horizontal synchronizing signal or no vertical synchronizing signal is input thereto.

The objects of the present invention are realized by a liquid crystal display apparatus which introduces horizontal synchronizing signals, vertical synchronizing signals and display data, and which drives a driver of liquid crystal panel in synchronism with the horizontal and vertical synchronizing signals to display the data on the liquid crystal panel. Namely, the liquid crystal display apparatus has an oscillator which generates timing signals maintaining a predetermined period irrespective of the horizontal and vertical synchronizing signals that are introduced. The driver of the liquid crystal panel is served with electric power from the power source and outputs of the oscillator. Even when the horizontal and vertical synchronizing signals are not applied to the driver, polarity of the driving voltage is reversed by the outputs of the oscillator, so that an a-c voltage of substantially a rectangular form is applied to the liquid crystal panel. Thus, since the driving voltage is applied in the form of an a-c voltage even when no horizontal or vertical synchronizing signal is input to the driving circuit of the liquid crystal panel, the display quality of the liquid crystal panel can be prevented from being degraded.

DESCRIPTION OF THE PREFERRED EMBODIMENT

Figure 1:
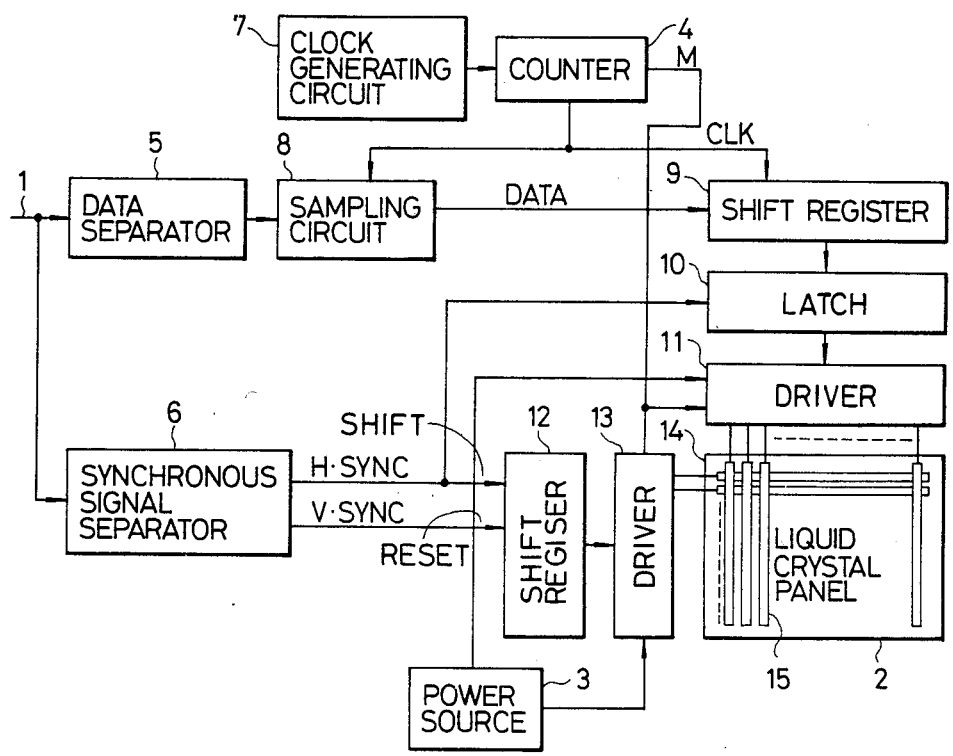
FIG. 1 is a block diagram showing a liquid crystal display apparatus according to an embodiment of the present invention.
Figure 2:
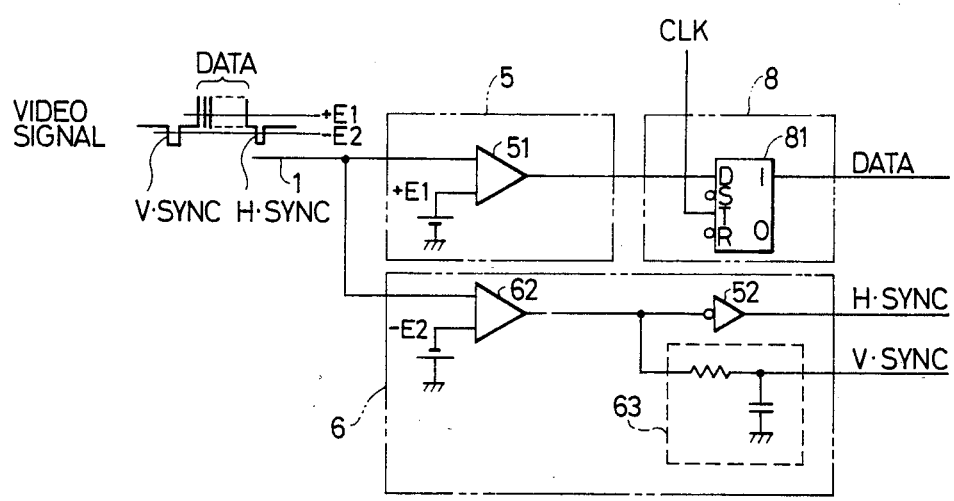
FIGS. 2, 3 and 4 are circuit diagrams of major portions of a main circuit of FIG. 1.

FIG. 1 is a block diagram showing a liquid crystal display apparatus according to an embodiment of the present invention. In FIG. 1, the liquid crystal display device is connected to a control device (not shown) via, for example, a cable. A video signal 1 is sent from the control device via the cable. The video signal 1 consists of a horizontal synchronizing signal H.SYNC, a vertical synchronizing signal V.SYNC, and a data signal, like a signal applied to the existing television sets. The video signal 1 is applied to a data separator circuit 5 and to a synchronizing signal separator circuit 6. FIG. 2 illustrates details of the date separator circuit 5 and the synchronizing signal separator circuit 6.

That is, the video signal 1 is sent to one terminal of a comparator 51 in the data separator circuit 5, while another terminal of the comparator 51 is served with a predetermined voltage ($+E_1$). Therefore, the comparator 51 produces a data signal that is compared with the voltage of $+E_1$ volts; the data signal is then sent to a sampling circuit 8.

The sampling circuit 8 consists of a flip-flop 81, and the data signal is input to a data terminal D of the flip-flop 81. Further, timing signals CLK of a predetermined period produced by a counter 4 that will be mentioned later, are input to a trigger terminal T of the flip-flop 81. Therefore, the data signals are sampled and produced by the flip-flop 81 responsive to the timing signals CLK.

The video signal is also input to one terminal of a comparator 62 in the synchronizing signal separator 6.

The other terminal of the comparator 62 is served with a predetermined voltage $-E_2$. The comparator 62 produces a synchronizing signal that is compared with a voltage of $-E_2$ volts. The synchronizing signal is input to an inverter 52 which produces a horizontal synchronizing signal H.SYNC that will be sent to a latch circuit 10 and to a shift register 12. Output of the comparator 62 is also input to an integration circuit 63 which integrates synchronizing signals to produce a vertical synchronizing signal V.SYNC that will be sent to the shift register 12.

A clock generating circuit 7 produces clock signals maintaining a predetermined period at all times. As illustrated in detail in FIG. 3, the clock generating circuit 7 consists of a parallel circuit of quartz oscillator 71 and inverter 72, that is connected to a resistor 73 of which the one end is grounded. Clock signals produced by the clock generating circuit 7 are input to the counter 4.

Figure 3:
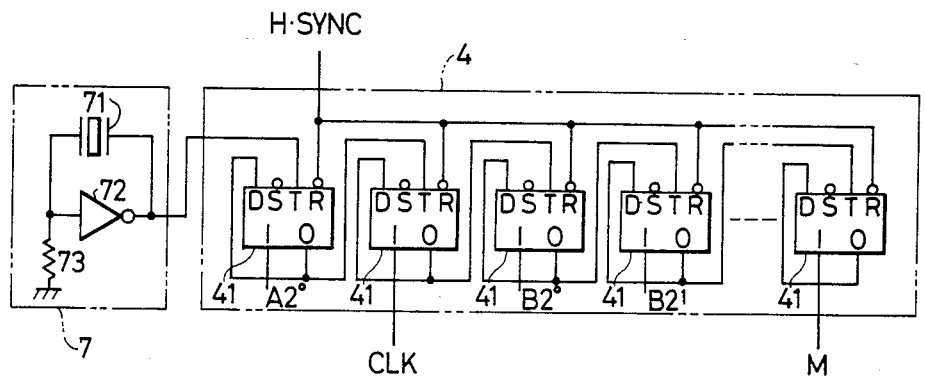

FIG. 3 illustrates in detail the counter 4 which consists of flip-flop circuits 41 of a plurality of stages. The clock signal is input to a trigger terminal T of the flip-flop circuit 41. Reset terminals R of the individual flip-flop circuits 41 are served, as reset signals, with outputs of the comparator 62 of the synchronizing signal separator circuit 6. Outputs on the side "0" of the individual flip-flop circuits 41 are input to their own data terminals D, and to the trigger terminals T of the flip-flop circuits 41 of the subsequent stages.

Outputs on the side "1" of the individual flip-flop circuits 41 serve as binary signals for the counter 4, and are counted up upon each receipt of clock signal from the clock generating circuit 7. Output on the side "1" of the flip-flop 41 of the second stage is sent as a clock signal CLK to the sampling circuit 8 and to a shift register 9 that will be mentioned later. Further, output of the side "1" of the flip-flop 41 of the final stage is sent to drivers 11 and 13 of the liquid crystal panel 2 as a signal M for switching the drive level of the liquid crystal panel 2.

The shift register 9 stores the data in an amount of one horizontal period, and shifts the data produced by the sampling circuit 8 according to a predetermined shift clock CLK.

The latch circuit 10 works as a register for temporarily storing the data in the shift register 9. When the data of an amount of one horizontal period is stored in the shift register 9, the data in the shift register 9 is set to the latch circuit 10 in parallel responsive to a horizontal synchronizing signal H.SYNC.

The shift register 12 is reset by a vertical synchronizing signal V.SYNC produced by the synchronizing signal separator 6, and is shifted upon each receipt of horizontal synchronizing signal H.SYNC, to drive scanning poles or electrodes 14 of the liquid crystal panel 2.

The drivers 11 and 13 are served with a predetermined voltage from a liquid crystal driving power source 3.

Figure 4:
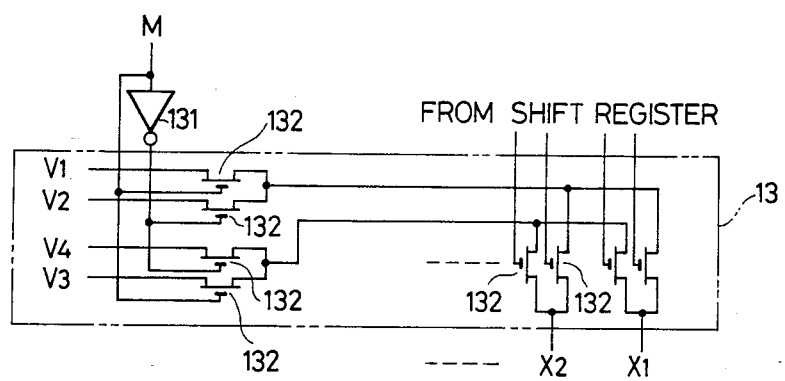
Figure 5:
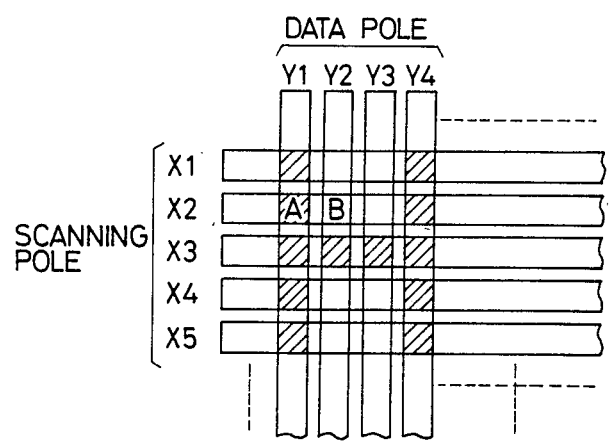
FIG. 5 is diagram showing data poles and scanning poles of the liquid crystal panel.

As is well known, the liquid crystal panel 2 has scanning poles or electrodes 14 and data poles or electrodes 15 that are arrayed in the form of a matrix. The scanning poles 14 and the data poles 15 are driven by the drivers 13 and 11. The driver 13 for the scanning poles 14 and the driver 11 for the data poles 15 so work as to apply alternating-current voltage waveforms to the liquid crystal panel 2 even when horizontal and vertical synchronizing signals have not been applied thereto. That is, as shown, for example, in FIG. 4, the driver 13 is made up of widely known transmission gates 132 to drive the scanning poles. Here, the scanning voltage consisting of four different voltage levels $V_1$ to $V_4$ is applied to the transmission gates 132 of the driver. The driver 11 for the data poles 15 is also constructed in the same manner as shown in FIG. 4, and in which the voltage consisting of four different voltage levels $V_5$ to $V_8$ is applied to the transmission gates of the driver 11. These voltage levels are switched by the voltage-level switching signals M produced by the counter 4, directly or via an inverter 131, such that a-c voltage is applied to the liquid crystal panel 2 even when the poles of the liquid crystal panel 2 have not been selected.

To simplify the description, here, let it be presumed that the character "H" is displayed on the liquid crystal panel 2 which consists of scanning poles $X_1$ to $X_5$ and data poles $Y_1$ to $Y_4$.

Further, the four voltage levels $V_1$ to $V_4$ applied to the driver 13 for the scanning poles are given as follows:

$$V_1 = V_0$$

$$V_2 = 0$$

$$V_3 = 1/a V_0$$

$$V_4 = (1 - 1/a) V_0$$

where
$V_0$: reference voltage
a: bias ratio (usually, $a = \sqrt{N} + 1$ where N is the number of scanning lines)

The four voltage levels $V_5$ to $V_8$ applied to the data or driver 11 for the signal poles are also given as follows:

$$V_5 = 0$$

$$V_6 = V_0$$

$$V_7 = 2/a V_0$$

$$V_8 = (1 - 2/a) V_0$$

In the following description, furthermore, voltages $V_9$ to $V_{14}$ are given as follows:

$$V_9 = 1/a V_0$$

$$V_{10} = -1/a V_0$$

$$V_{11} = V_0$$

$$V_{12} = -V_0$$

$$V_{13} = (1 - 2/a) V_0$$

$$V_{14} = -(1 - 2/a) V_0$$

Figure 6:
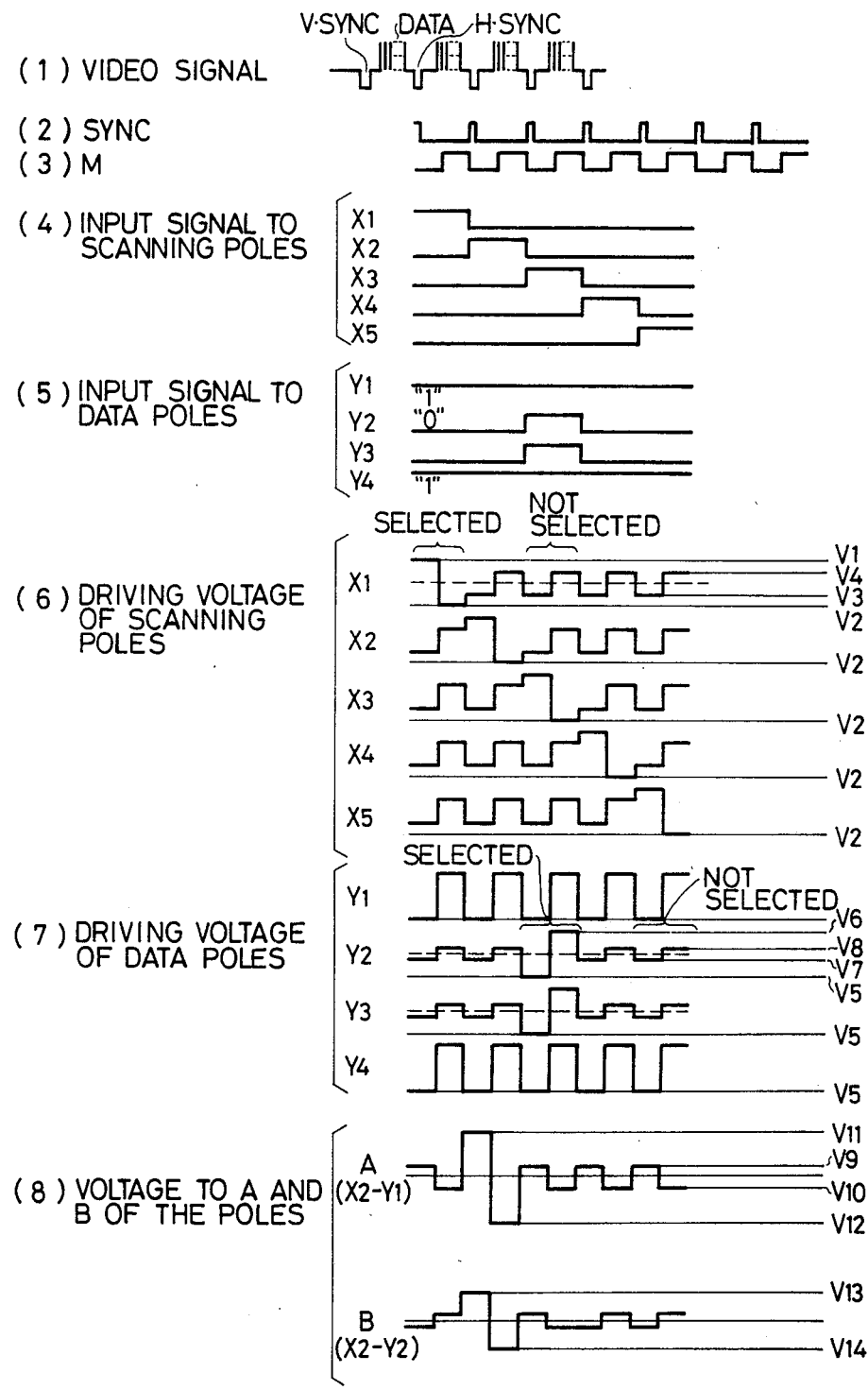
FIG. 6 is a diagram of signals for illustrating the operation.

Referring to the diagram (4) of FIG. 6, the scanning poles $X_1$ to $X_5$ are successively scanned upon receipt of horizontal synchronizing signals. In the diagram (5), on the other hand, signals are input to the data poles $Y_1$ to $Y_4$ responsive to the character "H" set to the latch circuit 10.

As shown in the diagram (6), therefore, the driving waveform of the scanning poles are successively selected starting from $X_1$. Namely, a voltage $V_1$ is applied to the selected poles, and a voltage $V_4-V_3$ is applied to the poles which are not selected.

In the diagram (7), on the other hand, a voltage $V_6$ is applied to the selected poles 15, and a voltage $V_7-V_8$ is applied to the poles 15 which are not selected.

As shown in the diagram (8), therefore, a voltage $V_{11}-V_{12}$ is applied to a picture element A (coordinate $X_2-Y_1$) consisting of liquid crystal when it is selected, and a voltage $V_9-V_{10}$ is applied thereto when it is not selected. On the other hand, an a-c voltage $V_{13}-V_{14}$ is applied to a picture element B (coordinate $X_2-Y_2$) which is not selected. Thus, a-c rectangular pulses of a peak voltage are applied to the selected picture elements in the liquid crystal panel, and a-c rectangular pulses of a voltage smaller than the peak voltage are applied to the picture elements which are not selected.

Here, it should be noted that the present invention is in no way limited to the above-mentioned embodiment only, but can be modified in a variety of other ways. For instance, a one-shot multivibrator may be employed in place of the counter 4, to utilize its output as a voltage-switching signal M.

Further, in the above-mentioned embodiment, the shift register 12 on the scanning side does not perform the scanning when horizontal and vertical synchronizing signals are not applied. However, it is also possible to operate the shift register 12 on output signals M produced by the counter 4, so that the scanning is performed by the output signals of the counter 12 when the horizontal and vertical synchronizing signals are not input to the register.

What is claimed is:

1. A liquid crystal display apparatus for displaying data on a liquid crystal panel, comprising:
a power source for supplying predetermined voltages;
electrodes arrayed in a predetermined manner in said liquid crystal panel;
synchronizing signal supplying means which produces synchronizing signals;
clock generating means which generates clock signals maintaining a predetermined period; and
driving means for generating an a-c voltage in accordance with said predetermined voltages from said power source and for driving said electrodes therewith, said driving means being responsive to said synchronizing signals from said synchronizing signal supplying means for driving said electrodes with an a-c voltage in synchronism with said synchronizing signals, said driving means being responsive to said clock signals from said clock generating means for driving said electrodes with an a-c voltage in accordance therewith in the absence of said synchronizing signals from said synchronizing signal supply means.

2. A liquid crystal display apparatus for displaying data on a liquid crystal panel according to claim 1, which further comprises:
a counter for counting clock signals produced by said clock generating means, the output of the counter being supplied to said driving means.

3. A liquid crystal display apparatus for displaying data on a liquid crystal panel by driving data electrodes and scanning electrodes that are arrayed in the form of a matrix, comprising:
a power source for supplying a plurality of voltage levels;
a first separator circuit which separates the data to be displayed from video signals that include the data to be displayed, horizontal synchronizing signals and vertical synchronizing signals;
a second separator circuit which separates horizontal synchronizing signals and vertical synchronizing signals from said video signals;
clock generating means which generates clock signals maintaining a predetermined period;
storing means which stores the data to be displayed in an amount of one horizontal period, which are successively sent from said first separator circuit, in synchronism with the clock signals from said clock generating means;
shift register means which is shifted by horizontal synchronizing signals produced by said second separator circuit, and which is reset by vertical synchronizing signals;
first drive means which drives data electrodes such that the data which is to be displayed and which is stored in said storing means, is displayed on the liquid crystal panel; and
second drive means for generating an a-c voltage in accordance with said plurality of voltage levels from said power source and for driving said scanning electrodes in accordance therewith, said second drive means being responsive to the outuputs of said shift regiser means for driving said scanning electrodes with an a-c voltage in synchronism with the synchronizing signals applied to said shift register means said second drive means being responsive to said clock signals from said clock generating means for driving said scanning electrodes with an a-c voltage in synchronism with said clock signals at least in the absence of synchronizing signals being applied to said shift register means.

4. A liquid crystal display apparatus according to claim 1, wherein said driving means includes means for switching said predetermined voltages from said power source in response to clock signals from said clock generating means.

5. A liquid crystal display, in which at least one signal electrode and at least one scanning electrode are arranged in the form of a matrix or a liquid crystal panel and are driven to display data on the basis of display data and picture signals including a horizontal synchronizing signal and a vertical synchronizing signal, comprising:
power source means for applying a plurality of levels of voltages;
first separator means for separating said display data from said picture signals;
second separator means for separating said horizontal synchronizing signal and said vertical synchronizing signal from said picture signals;
first signal generating means for generating clock signals of a predetermined period;
means for storing one horizontal period portion of display data, which are successively supplied from said first separator means, in synchornism with a clock signal from said first signal generating means;
second signal generating means for shifting among the plurality of levels of voltages from said power source means in accordance with a clock signal from said first signal generating means for generating a switching signal enabling generation of first and second a-c voltages;
first driving means for controlling generation of said first a-c voltage in accordance with a switching signal from said second signal generating means and for applying said first a-c voltage to said at least one signal electrode in synchronism with a horizontal synchronizing signal wherein said horizontal synchronizing signal is present and for applying said first a-c voltage when said horizontal synchronizing signal is absent so as to enable display of said data stored in said storage means on said liquid crystal panel;

shift register means responsive to said horizontal synchronizing signal from said second separator means for effecting shifting and for being reset by said vertical synchronizing signal; and second driving means for controlling generation of said second a-c voltage in accordance with a switching signal from said second signal generating means and for applying said second a-c voltage to said at least one electrode in synchronism with said horizontal synchronizing signal when said horizontal synchronizing signal is present and for applying said second a-c voltage when said horizontal synchronizing signal is absent so as to enable scanning of said at least one scanning electrode in accordance with the content of said shift register means.

6. A liquid crystal display apparatus according to claim 5, wherein said second signal generating means includes counter means for counting clock signals from said first signal generating means, said second signal generating means applying a switching signal to said second driving means each time the value of said counter means reaches a predetermined level.

7. A liquid crystal display apparatus according to claim 5, wherein said first driving means includes first and second transmission gate means, said first transmission gate means being enables in accordance with a switching signal from said second signal generating means and an inverted signal of said switching signal for controlling generation of said first a-c voltage, said second transmission gate means being enabled in accordance with the binary condition of said display data and for enabling application of said first a-c voltage to said at least one signal electrode, and said second driving means including third and fourth transmission gate means, said third transmission gate means being enabled in accordance with a switching signal from said second signal generating means and an inverted signal of said switching signal for generation of said second a-c votlage, said fourth transmission gate means being enabled in accordance with the binary condition of said horizontal synchronizing signal for enabling application of said second a-c voltage to said at least one scanning electrode.

* * * * *